United States Patent
Lota (10) Patent No.: US 10,503,232 B2
(45) Date of Patent: Dec. 10, 2019

(54) VEHICLE CHARGE RESOURCE MANAGEMENT

(71) Applicant: Toyota Motor Engineering & Manufacturing North America, Inc., Erlanger, KY (US)

(72) Inventor: Charan S. Lota, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 32 days.

(21) Appl. No.: 15/665,808

(22) Filed: Aug. 1, 2017

(65) Prior Publication Data

US 2019/0041940 A1 Feb. 7, 2019

(51) Int. Cl.
*H02J 7/00* (2006.01)
*G06F 1/3203* (2019.01)
*B60L 1/00* (2006.01)
*G06F 1/26* (2006.01)
*B60L 53/64* (2019.01)
*B60L 58/13* (2019.01)
*H02J 7/02* (2016.01)

(52) U.S. Cl.
CPC ............ *G06F 1/3203* (2013.01); *B60L 1/006* (2013.01); *B60L 53/64* (2019.02); *B60L 58/13* (2019.02); *G06F 1/26* (2013.01); *G06F 1/266* (2013.01); *H02J 7/0027* (2013.01); *H02J 7/0054* (2013.01); *B60L 2250/12* (2013.01); *B60L 2250/16* (2013.01); *B60L 2260/52* (2013.01); *H02J 7/0047* (2013.01); *H02J 7/025* (2013.01); *H02J 2007/005* (2013.01); *H02J 2007/0098* (2013.01)

(58) Field of Classification Search
CPC .......... G06F 1/3203; G06F 1/26; B60L 1/006; B60L 11/184; H02J 7/0054
USPC ....................................... 320/128, 132, 137
See application file for complete search history.

(56) References Cited

U.S. PATENT DOCUMENTS 6,571,949 B2 6/2003 Burrus, IV et al.
8,970,173 B2 3/2015 Kelty et al.
(Continued)

OTHER PUBLICATIONS

Coolbox an Advanced Toolbox with Bluetooth Speaker, USB Charger, and More, Jan. 28, 2015. (https://www.coolbox.o/).

*Primary Examiner* — Zixuan Zhou
(74) *Attorney, Agent, or Firm* — Christopher G. Darrow; Darrow Mustafa PC (57) ABSTRACT

A method and device for vehicle charge resource management are disclosed. The vehicle charge resource management includes polling a plurality of docking stations for docking indication data, and identifying a docked set therefrom. State-of-charge data for each respective ones of the docked set is assessed, and a recharging rate for the each respective ones of the docked set. Recharge status data may be generated based on the recharging rate to indicate a time-to-recharge for the each respective ones of the docked set. When the recharge status data compares unfavorably with the state-of-charge data for the vehicle power supply, transmitting a user input request that includes the recharge status data to prompt user input. User input data is received, and recharge command data generated therefrom. The recharge command data may be transmitted to initiate a recharge of at least one of the docked set via the vehicle power supply.

18 Claims, 5 Drawing Sheets

(56) References Cited

U.S. PATENT DOCUMENTS

| | | |
|---|---|---|
| 9,315,108 B2 | 4/2016 | Yokoyama et al. |
| 2008/0035507 A1 | 2/2008 | Collister et al. |
| 2009/0268385 A1* | 10/2009 | Harbin ................. G06F 1/16 361/679.02 |
| 2010/0017249 A1* | 1/2010 | Fincham ................ B60L 3/12 705/412 |
| 2010/0106631 A1* | 4/2010 | Kurayama ......... B60L 11/1816 705/34 |
| 2011/0266996 A1* | 11/2011 | Sugano ................ B60L 3/003 320/104 |
| 2013/0298618 A1 | 11/2013 | Gotter |

* cited by examiner

FIG. 4
human-to-machine interface 360

FIG. 5

VEHICLE CHARGE RESOURCE MANAGEMENT

FIELD

The subject matter described herein relates in general to vehicle charge resource management and, more particularly, to the sensing and recharging order of portable electronic devices based on a state-of-charge of the vehicle power supply.

BACKGROUND

Vehicle chargers have generally been available for recharging portable electronic devices. With a greater variety of devices and recharge requirements, vehicles may have encountered a charge drain beyond the capacity of a vehicle power supply, whether for a petroleum-based engine system, an electric-based engine system, and/or a hybrid-based engine system. When such a charge drain occurs, the principle function of the vehicle becomes frustrated, such as starting the vehicle in a petroleum-based engine system, arriving at a destination without interruption, such as with an electric-based engine, etc.

A need exists for vehicle charge resource management that may balance the recharging of portable electronic devices with the charge needed to accomplish the objective of the vehicle power supply in view of the engine type.

SUMMARY

A device and method for vehicle charge resource management are disclosed.

In one implementation, a method for vehicle charge resource management is disclosed. The method includes polling a plurality of docking stations for docking indication data, and identifying a docked set of the plurality of docking stations based on the docking indication data. State-of-charge data for each respective ones of the docked set of the plurality of docking stations is assessed, and a recharging rate for the each respective ones of the docked set. Recharge status data may be generated based on the recharging rate to indicate a time-to-recharge for the each respective ones of the docked set. When the recharge status data compares unfavorably with the state-of-charge data for the vehicle power supply, transmitting a user input request that includes the recharge status data to prompt user input. Responsive to the user input request, user input data, user input data is received and recharge command data generated from the user input data. The recharge command data may be transmitted to initiate a recharge of at least one of the docked set via the vehicle power supply.

In another implementation, a vehicle control unit is disclosed. The vehicle control unit includes a communication interface to service communication with a vehicle network, a processor communicably coupled to the communication interface and to a plurality of docking stations, and memory communicably coupled to the processor. The memory stores a dock assessment module including instructions that, when executed by the processor, cause the processor to poll the plurality of docking stations for docking indication data, to identify a docked set of the plurality of docking stations based on the docking indication data, and to produce a docked set identification based on the docking indication data. The memory further stores a battery-charge assessment module including instructions that, when executed by the processor, cause the processor to assess state-of-charge data for each respective ones of the docked set of the plurality of docking stations and for a vehicle power supply, to assess a recharging rate for the each respective ones of the docked set, and to generate recharge status data, based on the recharging rate, that operates to indicate a time-to-recharge for the each respective ones of the docked set. The memory further stores a transmission module including instructions that, when executed by the processor, cause the processor to, when the recharge status data compares unfavorably with the state-of-charge data for the vehicle power supply, transmit a user input request that includes the recharge status data to prompt user input, to receive, responsive to the user input request, user input data, to generate recharge command data based on the user input data, and to transmit the recharge command data for initiating a recharge of at least one of the docked set via a residual charge component of the vehicle power supply.

BRIEF DESCRIPTION OF THE DRAWINGS

The description makes reference to the accompanying drawings wherein like reference numerals refer to like parts throughout the several views, and wherein.

DETAILED DESCRIPTION

A method and device are provided for sensing and recharging portable electronic devices based on a state-of-charge of the vehicle power supply. Generally, vehicle power supplies for electric, hybrid, and/or petroleum-based vehicles have electric-charge capacity limitations, and are themselves recharged to sustain a useable charge.

For example, electric vehicles may be recharged (or refueled) at electric vehicle fueling stations. Hybrid vehicles may be recharged by alternating gas/electric operations, while the vehicle power supply for petroleum-based vehicles may be charged by on-board devices, such as alternator. Generally, while a vehicle power supply is being recharged, portable electronic devices (such as portable power tools, laptops, tablets, phablets, etc.) may also be recharged by the common-overall charging device for the vehicle; however, without active recharging of the vehicle power supply, portable electronic devices may draw excess charge from the finite charge of a vehicle power supply, which may cause a vehicle to not be able to be started, such as a petroleum-based vehicle, or cause a vehicle to run out of "fuel," such as with an electric vehicle.

The method and device described herein includes a plurality of docking stations with a vehicle for receiving rechargeable battery devices, and determining a capability of a vehicle power supply to provide a recharge function to the rechargeable battery devices. When the vehicle power supply is unavailable to recharge all of the docked rechargeable battery devices, or a time for which the vehicle operator may need one docked rechargeable device to be serviceable take priority over other rechargeable battery devices, the vehicle operator may prioritize recharging of the rechargeable battery devices.

Figure 1:
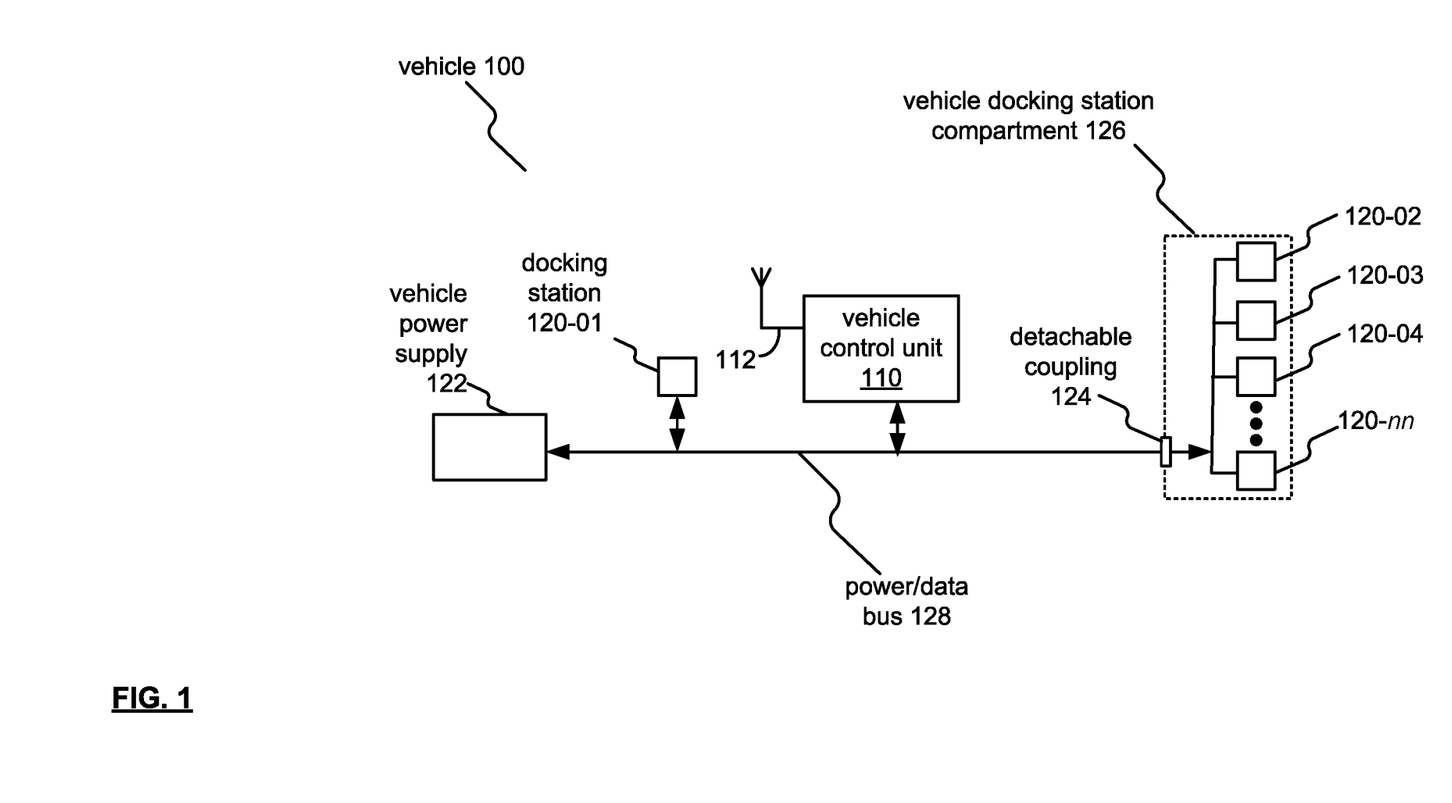
FIG. 1 shows a schematic illustration of a vehicle including a vehicle control unit for vehicle charge resource management.

FIG. 1 shows a schematic illustration of a vehicle 100 including a vehicle control unit 110 for vehicle charge resource management. The vehicle 100 may include a plurality of docking stations 120-01, 120-02, 120-03, 120-04 through 120-$nn$, which may be coupled to a vehicle power supply 122 via a power/data bus 128.

The vehicle control unit 110 may operate to provide vehicle charge resource management as discussed herein relating to a state-of-charge of the vehicle power supply 122 and to rechargeable battery devices that may be docked with docking stations 120-01, 120-02, 120-03, 120-04 through 120-$nn$.

State-of-charge data may be considered, by analogy, a fuel gauge for a battery pack source of the device (such as the vehicle power source, a smartphone, cordless power tools, flashlights, etc.). The state-of-charge may be represented as percentage points (e.g., 0% relays an empty state; 100% relays a full state). Other forms of state-of-charge may be the inverse representation, which may also be referred to as a depth of charge (e.g., 100% relays an empty state, 0% relays a full state). State-of-charge data may be presented via Coulomb counter integrated-circuit data, a fuel gauge integrated-circuit data, a programmable fuel gauge integrated-circuit data, etc.

The antenna 112, communicatively coupled with the vehicle control unit 110, may include one or more conductive elements that interact with electromagnetic signals transmitted by global positioning system satellites. The received signals may be transformed into a data signal indicative of the location (for example, latitude and longitude positions), and indicative of the positioning of the vehicle 100.

Each of the docking stations 120-01, 120-02, 120-03, 120-04 through 120-$nn$ may operate to provide a simplified way of plugging-in a rechargeable battery device, such as a handheld mobile device (such as, e.g., a smart phone, a cellular phone, a tablet, a phablet, a laptop computer, etc.), a power tool (such as, e.g., a battery-powered drill, a battery-powered saw, a battery-powered sander), or other battery-powered devices.

The docking stations 120-01, 120-02, 120-03, 120-04 through 120-$nn$ (which may be generally referred to as docking stations 120) may include a mating adaptor configuration for specific makes and/or models of battery-powered devices. The docking stations 120 may also include a combination of mating adaptor configurations and/or a universal form of recharge interface, such as via a wireless power interface (such as loose or tight wireless power coupling). Wireless power interfaces may be implemented under standards specifications of wireless power organizations, such as, e.g., the Wireless Power Consortium (Qi).

Also, docking stations may be combined within a common area and/or case, such as a vehicle docking station compartment 126 that may include docking stations 120-02, 120-03, 120-04 through 120-$nn$. The compartment 126 may be detachably coupled with the vehicle power supply 122 via detachable coupling 124. For example, the vehicle docking station compartment 126 may be a vehicle.

Rechargeable battery packs for rechargeable battery devices, which may include the vehicle power supply 122, may be based on various battery types (e.g., Lithium Polymer, Lithium Phosphate, Nickel Metal Hydride, Nickel Cadmium, etc.), that may provide various energy density characteristics. A primary characteristic of a rechargeable battery relates to its respective capacity, specified in milli-amp-hours (mAh) and defined as the maximum amount of charge the device can deliver.

A state-of-charge may be based on a respective discharge profile of rechargeable battery device. The discharge profile relates to the drop of battery voltage as it discharges, and the remaining energy may be determined based on the present voltage of the device.

At present, in contrast to petroleum fuel levels, measuring remaining battery charge(s) may be based on estimates, or on computer models that may update operational variables for the battery environments to generate more modeling accuracy. Accordingly, real-time (or near real-time) modeling may estimate remaining battery charge within five-percent. For example, when a model determines a battery state-of-charge at 48 percent, the actual state of charge may be between 43-percent and 53-percent.

As another example, using the vehicle power source 122, at full charge may register 12.75 volts, and when "depleted" may register 10.8 volts. Accordingly, the charge the vehicle power source 122 may give is above 10.8 volts, less the charge amount needed to reach a destination. With the amount of current-amps being used continuously over time, and in combination with the mAh rating of the battery, the state-of-charge may be determined. Using the vehicle power supply 122, if an example has an average Amp Hour rating of 80 Ah, operating the vehicle radio (that uses 8 amps, for example) with the petroleum-based vehicle off (that is, no recharging by the vehicle engine), the vehicle power supply 122 may power the radio for ten-hours before the battery is dead; much less to start the vehicle without a battery-jump.

Though capacity may be specified, changes in the battery environment (such as temperature, moisture, etc.) may affect the charge capacity. Charge capacity may be considered as proportional to battery temperature. In general, higher charge capacity may be realized at higher temperatures than at lower temperatures.

Also, smart battery technologies may provide built-in battery management systems for rechargeable battery devices. Smart battery technologies may operate to internally measure voltage and current, and deduce charge level and state-of-health parameters, indicating the state of the cells. A smart battery may communicate with the vehicle control unit 100 via the power/data bus 128. The smart battery technology may operate to initiate charging stops and/or request charging.

Built-in management battery systems may be implemented under various standards specifications, such as SMBus, PMBus, EIA-232, EIA-485, MIPI BIF, Local Interconnect Network, etc. Other examples may identify and control accessories/peripherals through a single-wire contact, such as battery-pack and power-adapter identification, LED control, TEDS ((Transducer Electronic Data Sheet) information for an instrument or measurement system to identify, characterize, interface, and properly use the signal from an analog sensor), etc.

Generally, in operation, the vehicle control unit 110 may poll the docking stations 120-01 to 120-$nn$ to determine which of these may be coupled with rechargeable battery devices. The vehicle control unit 110 may also poll the associated recharge resources called upon the vehicle power supply 122 to recharge the devices directly and/or indirectly coupled with docking stations 120-01 to 120-$nn$.

From polling, at least some of the docking stations 120-01 to 120-$nn$ may have rechargeable battery devices docked for recharging from the vehicle power supply 122. The example method may operate to assess state-of-charge data for each of the rechargeable battery devices, and assess a recharge rate for the rechargeable battery devices.

With respect to conditions in which insufficient remaining charge for the vehicle power supply 122, a user input request may be transmitted to prompt user input, from which recharge command data may be transmitted to initiate a recharge of at least a selected one of the rechargeable battery devices via the docking stations 120-01 to 120-nn.

In this respect, resource allocation between recharging devices docked with docking stations 120 and the charge state of the vehicle power supply 122 may occur by on-the-fly selection, on a pre-determined order, and/or based on user input.

For example, when the vehicle 100 is an electric vehicle, the vehicle control module 110 can determine and/or estimate the amount of charge the vehicle power supply 122 needs to include to arrive at a destination, such as a job site, or to a vehicle charging station (such as via mapping applications and vehicle location data). When the charge amount of the vehicle power supply becomes insufficient to achieve the destination, a graphical user interface may prompt the vehicle user to select one or many of the docking stations 120 (and associated battery packs and/or devices) to decouple from the vehicle power supply 122.

Resource allocation may also be placed in an ordered set of docking stations 120 by the vehicle user. For example, when the battery charge of the vehicle power supply 122 may be sufficient for a subset of all rechargeable battery devices coupled with docking stations 120-01 to 120-nn (such as power tools) to be recharged by the vehicle power supply 122, a charging priority may be based on a pre-determined or on-the-fly (via user input) recharging sequence.

As a further aspect, battery pack maintenance may be included to provide scheduled maintenance for each identified battery pack associated with a docking station 120. For example, the battery pack may be identified by manufacturer model, manufacturer model, battery-type, expected lifespan, full drain-per-charge data, etc.

Also, a history of devices commonly with the vehicle may operate as an inventory system, such as with the vehicle docking station compartment 126. For example, a journeyman may have a core inventory of rechargeable power tools for use in their trade. When the vehicle control unit 110 does not detect one of the core power tool items docked with docking stations 120-02, 120-03, 120-04 to 120-nn, a graphical user interface (such as via a head unit device, a heads-up display, etc.) may advise the vehicle user of the "missing" item (such as may have been inadvertently left at a job site, borrowed without permission, become faulty and needing replacement, etc.).

Figure 2:
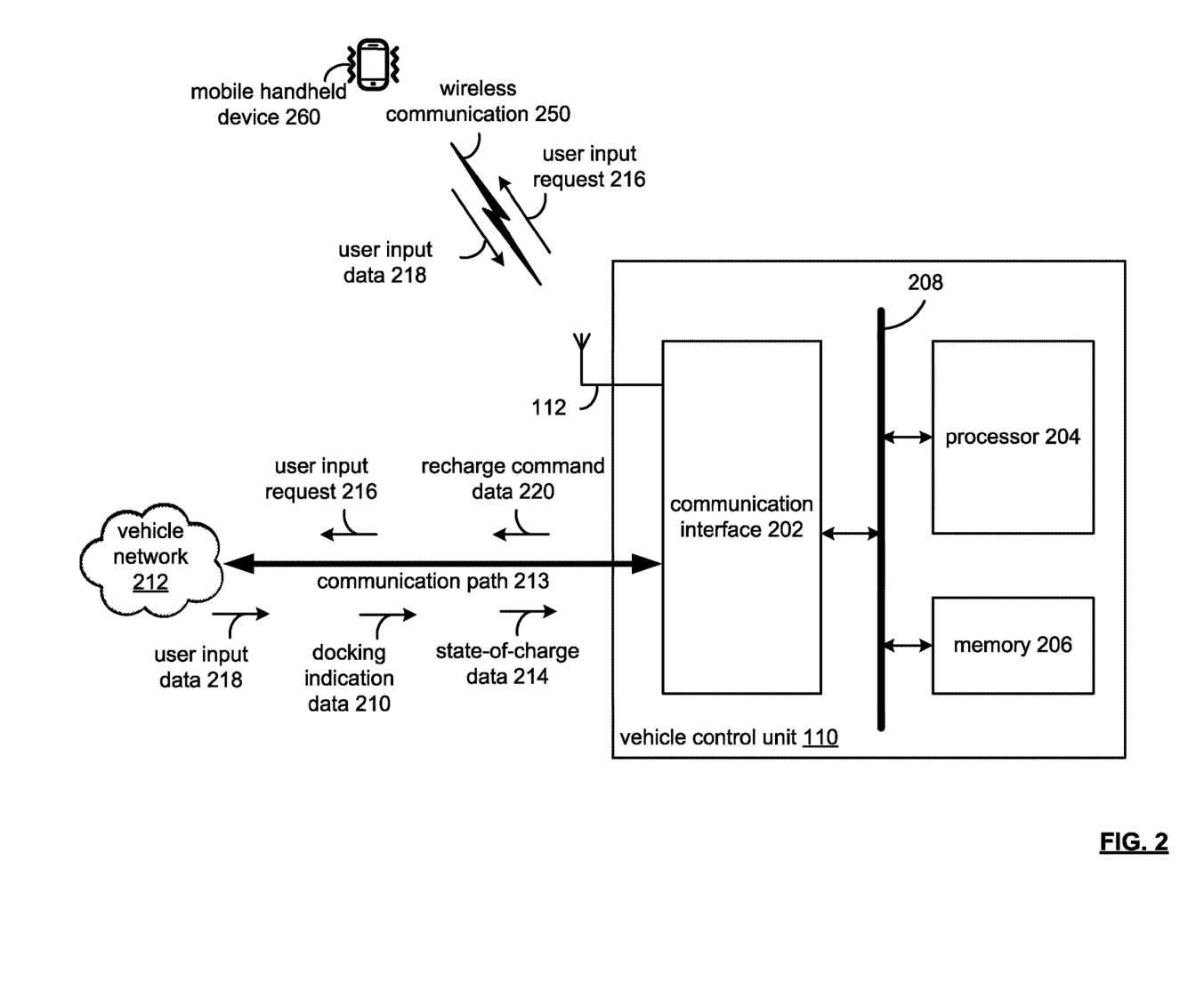
FIG. 2 shows a block diagram of the vehicle control unit of FIG. 1.

FIG. 2 illustrates a block diagram of the vehicle control unit 110 of FIG. 1. The vehicle control unit 110 may include a communication interface 202, a processor 204, and memory 206, that are communicably coupled via a bus 208. The vehicle control unit 110 may provide an example platform for the device and methods described in detail with reference to FIGS. 1-5.

The processor 204 can be a conventional central processing unit or any other type of device, or multiple devices, capable of manipulating or processing information. As may be appreciated, processor 204 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The memory (and/or memory element) 206 may be communicably coupled to the processor 204, and may operate to store one or more modules described herein. The modules can include instructions that, when executed, cause the processor 204 to implement one or more of the various processes and/or operations described herein.

The memory and/or memory element 206 may be a single memory device, a plurality of memory devices, and/or embedded circuitry of the processor 204. Such a memory device may be a read-only memory, random access memory, volatile memory, non-volatile memory, static memory, dynamic memory, flash memory, cache memory, and/or any device that stores digital information. Furthermore, arrangements described herein may take the form of a computer program product embodied in one or more computer-readable storage medium having computer-readable program code embodied, e.g., stored, thereon. Any combination of one or more computer-readable media may be utilized. The computer-readable medium may be a computer-readable signal medium or a computer-readable storage medium.

The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device. Program code embodied on a computer-readable medium may be transmitted using any appropriate medium, including but not limited to wireless, wireline, optical fiber, cable, RF, etc., or any suitable combination of the foregoing.

The memory 206 is capable of storing machine readable instructions, or instructions, such that the machine readable instructions can be accessed and/or executed by the processor 204. The machine readable instructions can comprise logic or algorithm(s) written in programming languages, and generations thereof, (e.g., 1GL, 2GL, 3GL, 4GL, or 5GL) such as, for example, machine language that may be directly executed by the processor 204, or assembly language, object-oriented programming (OOP) such as JAVA, Smalltalk, C++ or the like, conventional procedural programming languages, scripting languages, microcode, etc., that may be compiled or assembled into machine readable instructions and stored on the memory 206. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods and devices described herein may be implemented in any conventional computer programming language, as pre-programmed hardware elements, or as a combination of hardware and software components.

Note that when the processor 204 includes more than one processing device, the processing devices may be centrally located (e.g., directly coupled together via a wireline and/or wireless bus structure) or may be distributed located (e.g., cloud computing via indirect coupling via a local area network and/or a wide area network). Further note that when the processor 204 implements one or more of its functions via a state machine, analog circuitry, digital circuitry, and/or logic circuitry, the memory and/or memory element storing the corresponding operational instructions may be embedded within, or external to, the circuitry including the state machine, analog circuitry, digital circuitry, and/or logic circuitry.

Still further note that, the memory 206 stores, and the processor 204 executes, hard coded and/or operational instructions of modules corresponding to at least some of the steps and/or functions illustrated in FIGS. 1-5.

The vehicle control unit 110 can include one or more modules, at least some of which are described herein. The modules may be considered as functional blocks that can be implemented in hardware, software, firmware and/or computer-readable program code that perform one or more functions. A module, when executed by a processor 204, implements one or more of the various processes described herein. One or more of the modules can be a component of the processor(s) 204, or one or more of the modules can be executed on and/or distributed among other processing systems to which the processor(s) 204 is operatively connected. The modules can include instructions (e.g., program logic) executable by one or more processor(s) 204.

The wireless communication interface 202 generally governs and manages the data received via a vehicle network 212. There is no restriction on the present disclosure operating on any particular hardware arrangement and therefore the basic features herein may be substituted, removed, added to, or otherwise modified for improved hardware and/or firmware arrangements as they may develop.

The antenna 112 may include one or more conductive elements that interact with electromagnetic signals transmitted by global positioning system satellites. The received signals may be transformed into a data signal indicative of the location (for example, latitude and longitude positions), and further indicative of the positioning of the vehicle with respect to road data.

The vehicle control unit 110 may be communicatively coupled to receive signals from global positioning system satellites, such as via the antenna 112 of the vehicle control unit 110, or other such vehicle antennae (not shown). The antenna 112 operates to provide communications with the vehicle control unit 110 through wireless communication 250.

Wireless communication 250 may operate to convey a user input request 216, which may include recharge states data and vehicle power supply state-of-charge data for prompting user input, such as via a mobile handheld device 260. The vehicle control unit 110 may, via the communication interface 202, receive the user input data 218. The user input data 218 may include resource allocation order between recharging devices docked with docking stations 120 and the charge state of the vehicle power supply 122, and/or a predetermined preference with respect a vehicle user input, which may be stored for future priority orders.

The wireless communication 250 may be based on one or many wireless communication system specifications. For example, wireless communication systems may operate in accordance with one or more standards specifications including, but not limited to, 3GPP (3rd Generation Partnership Project), 4GPP (4th Generation Partnership Project), 5GPP (5th Generation Partnership Project), LTE (long term evolution), LTE Advanced, RFID, IEEE 802.11, Bluetooth, AMPS (advanced mobile phone services), digital AMPS, GSM (global system for mobile communications), CDMA (code division multiple access), LMDS (local multi-point distribution systems), MMDS (multi-channel-multi-point distribution systems), IrDA, Wireless USB, Z-Wave, Zig-Bee, and/or variations thereof.

As may be appreciated, the communication path 213 of the vehicle network 212 may be formed from a medium suitable for transmitting a signal such as, for example, conductive wires, conductive traces, optical waveguides, or the like. Moreover, the communication path 213 can be formed from a combination of mediums capable of transmitting signals, such as conductive traces, conductive wires, connectors, and buses that cooperate to permit the transmission of electrical data signals to components such as processors, memories, sensors, input devices, output devices, and communication devices.

Accordingly, the communication path 213 may be provided by a vehicle bus, or combinations thereof, such as for example, a Body Electronic Area Network (BEAN), a Controller Area Network (CAN) bus configuration, an Audio Visual Communication-Local Area Network (AVC-LAN) configuration, a Local Interconnect Network (LIN) configuration, a Vehicle Area Network (VAN) bus, and/or other combinations of additional communication-system architectures to provide communications between devices and systems of the vehicle 100.

The term "signal" may be understood to relate to a waveform (e.g., electrical, optical, magnetic, mechanical or electromagnetic), such as DC, AC, sinusoidal-wave, triangular-wave, square-wave, vibration, and the like, capable of traveling through at least some of the mediums described herein.

Respective modules of the vehicle control unit 110, and associated instructions, when executed by the processor 204, cause the processor 204 to receive docking indication data 210 and state-of-charge data 214 relating to rechargeable battery devices coupled with docking stations 120 and the vehicle power supply 122 (FIG. 1). A user input request 216 may be transmitted that includes recharge status data and vehicle power supply state-of-charge data to a prompt a user input. User input data 218, responsive to the user input request 216, may be received via the communication interface 202, and generate recharge command data 220. The vehicle control unit 110 may transmit the recharge command data 220 to initiate a recharge of at least one of the docked set via a vehicle power supply 122 (FIG. 1).

Figure 3:
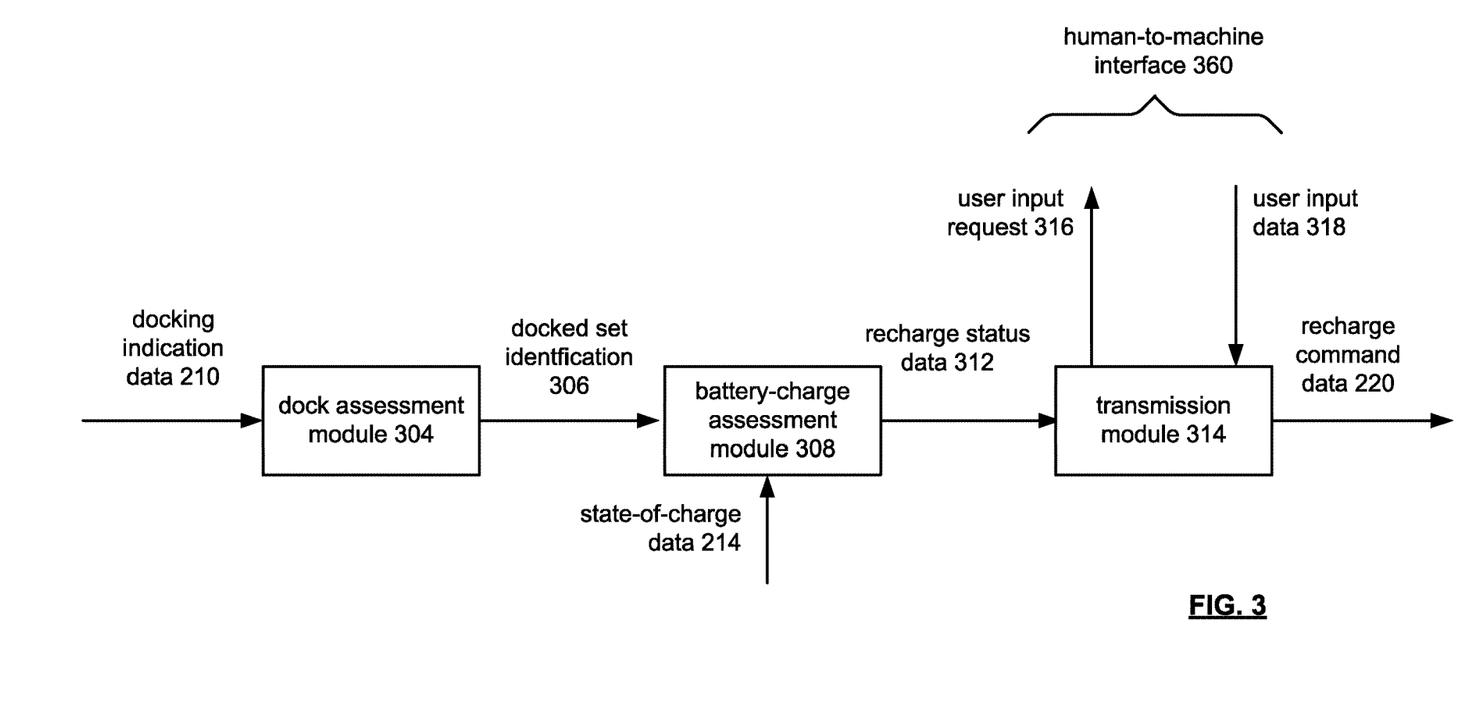
FIG. 3 illustrates a functional module block diagram stored in a memory for the vehicle control unit of FIG. 2.

FIG. 3 illustrates a functional module block diagram stored in a memory 206 for the vehicle control unit 110 of FIG. 2, where memory 206 may store a dock assessment module 304, a battery-charge assessment module 308, and transmission module 314.

The dock assessment module 304 includes instructions that, when executed by the processor 204, cause the processor 204 to poll a plurality of docking stations 120 for docking indication data 210. As may be appreciated, each of the plurality of docking stations 120 (FIG. 1) may operate to receive rechargeable battery device and couple directly and/or indirectly to the rechargeable battery device.

Further instructions operate to identify a docked set of the plurality of docking stations 120 (FIG. 1) based on the docking indication data 210. That is, which of the plurality of docking stations 120 may have coupled with a rechargeable battery device may form a docked set to produce a docked set identification 306.

The battery-charge assessment module 308 includes instructions that, when executed by the processor 204, cause the processor 204 to assess state-of-charge data 214 for each respective ones of the docked set of the plurality of docking stations of the docked set identification 306, and to assess a recharging rate for the each respective ones of the docked set.

Recharging rates may be generated by monitoring a plurality of rechargeable-battery parameters (such as current draw, temperature, battery structure, etc.) of the each respective ones of the docked set, and empirically determining a cell capacity and a charge of the each respective ones of the docked set based on the plurality of rechargeable parameters. As an alternative, recharge rate data may be generated by monitoring current flowing into the each respective ones of the docked set, and monitoring current flowing out of the each respective ones of the docked set.

Based on the recharging rate, the battery-charge assessment module 308 may further include instructions to generate recharge status data 312 that may indicate a time-to-recharge for the each respective ones of the docked set.

The transmission module 314 includes instructions that, when executed by the processor 204, cause the processor 204 to, when the recharge status data 312 compares unfavorably with the state-of-charge data 214 for the vehicle power supply (FIG. 1), transmit a user input request 316 that includes the recharge status data 312 to prompt user input. The user input request 316 may be provided to a human-to-machine interface 360 (such as a smartphone, a tablet, a phablet, a head unit device, a heads-up display device, etc.). The user input request 316 operates to have a user prioritize which of the docked set to have recharged. Based on the residual charge component of the vehicle power supply (that is, the charge available for other uses besides powering an electric vehicle drive), at least one of the docked set may be recharged. Also, as may be appreciated, the time-to-recharge information may also provide the user with information directed to timely recharging a device prior to arriving at a destination.

For example, a tradesman may desire to have a particular power tool fully charged so that he or she may begin work once arriving at the job site. When the time-to-recharge may be greater than the time-to-travel to a destination, the tradesman may conduct other business while the power tool recharges.

The vehicle control unit 110, via the transmission module 314, receives, responsive to the user input request 316, user input data 318, and generates recharge command data 220 based on the user input data 318. The user input data 318 may be provided by a human-to-machine interface 360, such as a handheld mobile device, a vehicle head unit, a vehicle heads-up display, etc.

The transmission module 314 transmits the recharge command data for initiating a recharge of at least one of the docked set via a residual charge component of the vehicle power supply.

Figure 4:
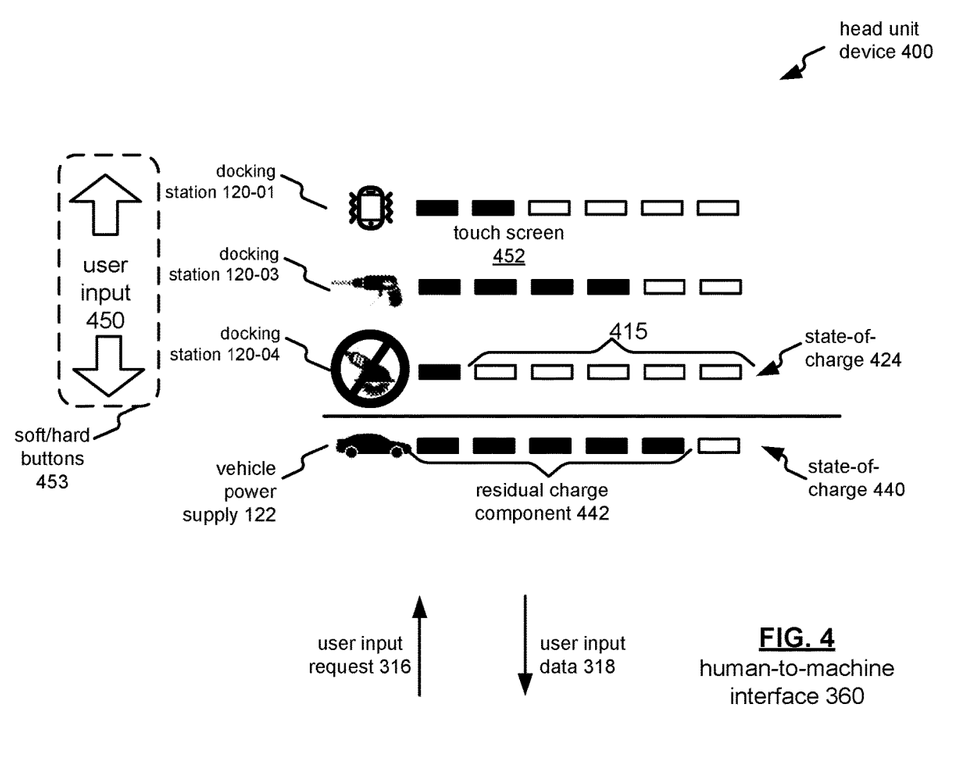
FIG. 4 illustrates an example of a graphical user interface displayed via a human-to-machine interface for vehicle charge resource management.

FIG. 4 illustrates an example of a graphical user interface displayed via a human-to-machine interface 360. The example human-to-machine interface 360 may be provided by a head unit device 400, with the touch screen 452 operable to display the user input request 316 to prompt user input. Receipt of the user input, when received may be output by the human-to-machine interface 360 as user input data 318.

The touch screen 452 may present a graphical user interface showing graphic representations of docking station 120-01, docking station 120-03, docking station 120-04, and vehicle power supply 122. The touch screen 452 may operate to display the recharging rate of each respective ones of a docked set of a plurality of docking stations on a scale of 0% indicating depletion to 100% indicating fully charged.

For example, the vehicle 100 (FIG. 1) may include docking stations 120-01, 120-02, 120-03, 120-04 to 120-nn. Docking indication data identifies the docked set including docking station 120-01 docking a smartphone device, docking station 120-03 docking a cordless drill, and docking station 120-04 docking a cordless saw. Icons may be selected by a vehicle user, by smart battery identifiers that may provide an icon, or random generic expressive icons (such as smiley faces, animals, emoticons, etc.).

Generally, when the recharge status data compares unfavorably with state-of-charge data for 440 for the vehicle power supply 122, the user input request 316 prompts user input, such as prioritizing a charging order of the docking stations 120-01, 120-03 and/or 120-04 of the docked set. An example of an unfavorable comparison may be that the state-of-charge 440 may be insufficient to recharge the battery powered devices directly and/or indirectly coupled with the respective docking station.

Further, the user input request 316 may graphically specify devices that may not be charged with a given state-of-charge 440 of the vehicle power supply 122. With respect to FIG. 4, the recharge status data 415 of the state-of-charge 424 for docking station 120-04 exceeds the residual charge component 442 of the vehicle power supply 122. In this respect, the graphic bar indicates the residual charge component 442 beyond a charge value, in the example of an electric-powered vehicle, to arrive at a user defined destination (such as a job site).

Accordingly, docking station 120-04 may be indicated as removed from recharging via user input, by marking docking station 120-01 and docking station 120-03 from recharging. In the alternative, user input 450 may include a prioritized recharging order that may be received via the touch screen 452, as well as via soft/hard buttons 453 to receive user input 450. Accordingly, the user input indicates a recharging priority of docking station 120-01 (relating to the smartphone icon), docking station 120-03 (relating to the cordless power drill icon), and no charging for docking station 120-04 (relating to the cordless power drill icon). In this respect, the human-to-machine interface 360 may output user input data 318 for generation of recharge command data to initiate the appropriate recharge of the docked set 120-01, 120-03 and 120-04.

As may also be appreciated, the docking stations 120 may provide an informal inventory of docked items. For example, at a job site, a user may leave behind the cordless power drill, cordless power saw, smartphone, tablet, phablet, etc. The docking stations 120 may be "locked" to specific docked items such that when the items are not present, the human-to-machine interface 360 may operate to alert the vehicle user (such as by visual, audible and/or haptic warning signal) of a missing item before departing to another destination. In this respect, the user may remove the vehicle docking stations compartment 126 (FIG. 1) to bring their tools with them, and when replaced with the vehicle 100 via the detachable coupling 124 (FIG. 1), the inventory function may serve as a check that the power tools are with the user, and not left at a job site.

Figure 5:
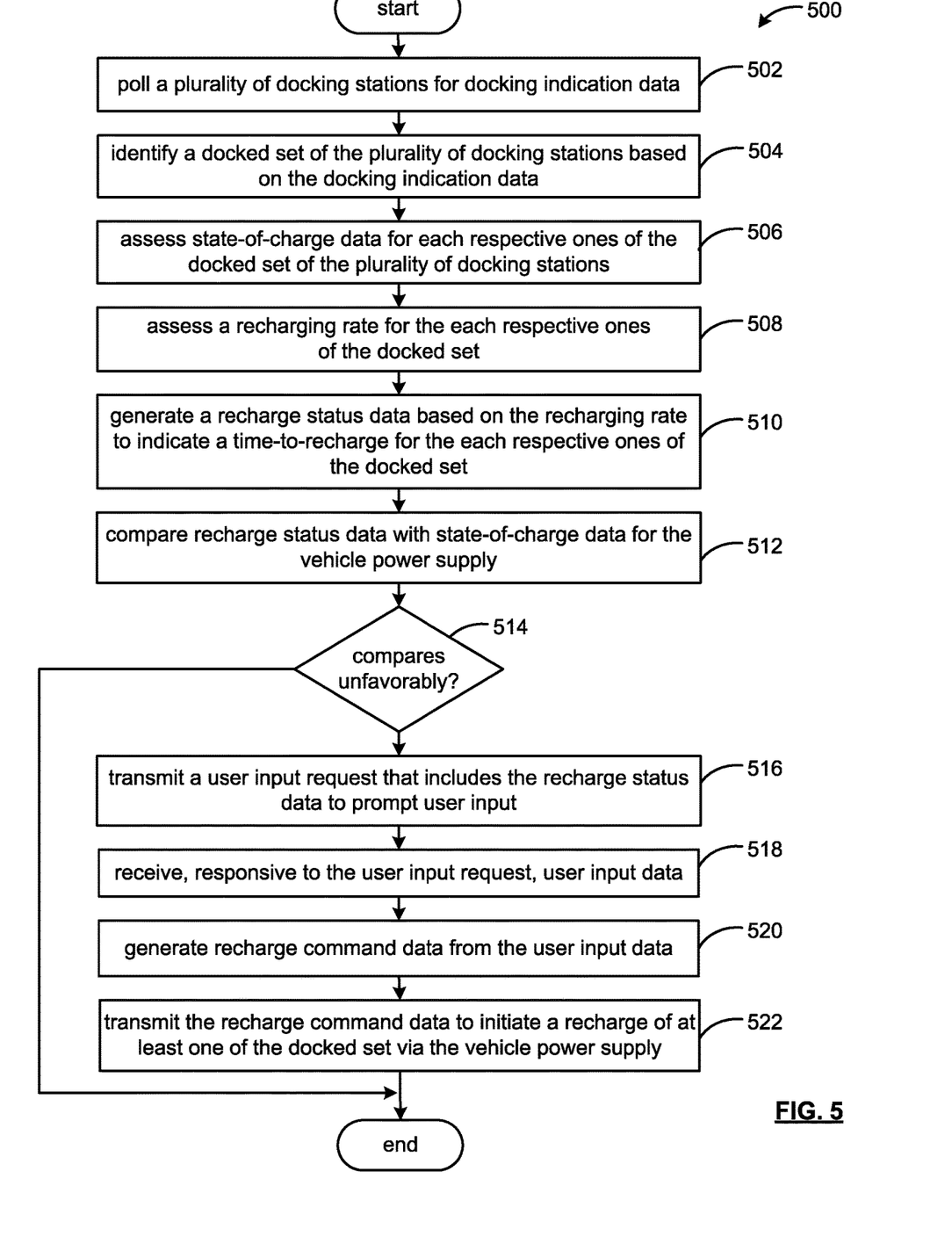
FIG. 5 shows an example process for vehicle charge resource management.

FIG. 5 illustrates an example process 500 for vehicle charge resource management. At operation 502, a plurality of docking stations a polled for docking indication data. Each of the docking stations are operable to receive a rechargeable battery device (such as a smartphone, tablet, phablet, a cordless power tool, flashlight, etc.). Based on the docking indication data, a docked set can be identified at operation 504 from the plurality of docking stations based on the docking indication data. In this respect, populated or docked stations can be identified. At operation 506, state-of-charge data may be assessed for each respective ones of the docked set of the plurality of docking stations.

State-of-charge data may be considered, by analogy, a fuel gauge for a battery pack source of the device (such as a vehicle power source, smartphone, cordless power tool, flashlight, etc.). The state-of-charge may be represented as percentage points (e.g., 0% relays an empty state; 100% relays a full state). Other forms of state-of-charge may be the inverse representation, which may also be referred to as a depth of charge (e.g., 100% relays an empty state, 0% relays a full state). State-of-charge data may be presented via Coulomb counter integrated-circuit data, a fuel gauge integrated-circuit data, a programmable fuel gauge integrated-circuit data, etc.

At operation 508, a recharging rate may be assessed for the each respective ones of the docked set. Recharging rates may be generated by monitoring a plurality of rechargeable-battery parameters (such as current draw, temperature, battery structure, etc.) of the each respective ones of the docked set, and empirically determining a cell capacity and a charge of the each respective ones of the docked set based on the plurality of rechargeable parameters. As an alternative, recharge rate data may be generated by monitoring current flowing into the each respective ones of the docked set, and monitoring current flowing out of the each respective ones of the docked set.

The recharging rate may depend on the battery structure, and average rate for recharge (or refueling). In this respect, each of the state-of-charge may be normalized with one another to provide a recharging assessment corresponding to one another. In this respect, at operation 510, recharge status data based on the recharging rate may be generated to indicate a time-to-recharge for the each respective ones of the docked set. Such information may relay to a vehicle operator the duration of charge that may be drawn from a vehicle power source for recharging purposes, as well as being operable to convey a "wait" time a vehicle operator will have with respect to each of the devices directly or indirectly coupled with the docking stations.

In this respect, at operation 512, the recharge status data may be compared with the state-of-charge data for the vehicle power supply. When at operation 514 the recharge status data compares unfavorably with the state-of-charge data for the vehicle power supply, indicating that a residual component of the vehicle power supply may not be sufficient to recharge each of the devices coupled directly or indirectly coupled with the docking stations, a vehicle user may be prompted to provide.

At operation 516, vehicle user input may be prompted by transmitting a user input request that includes the recharge status data to prompt user input. The user input request may be presented via a human-to-machine interface, such as a being displayed via a smartphone, a head unit display, a head-up display, etc. At operation 518, user input data may be received in response.

At operation 520, recharge command data may be generated from the user input data, and may be transmitted at operation 522 to initiate a recharge of at least one of the docked set via the vehicle power supply. As may be appreciated, the vehicle power supply, when itself is not undergoing recharging operations, includes a finite amount of charge.

A residual charge component in excess of the finite amount of charge may be directed for ancillary functions such as recharging features, while the principle charge component operates to fuel and/or power principle functions of the vehicle—that is, starting the vehicle (when the drive system is based on a petroleum-based engine type), powering the vehicle for transport to a destination (when the drive system is an electric-based engine type), etc.

As one of ordinary skill in the art may appreciate, the term "substantially" or "approximately," as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise.

As one of ordinary skill in the art may further appreciate, the term "coupled," as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (that is, where one element is coupled to another element by inference) includes direct and indirect coupling between two elements in the same manner as "coupled."

As one of ordinary skill in the art will further appreciate, the term "compares unfavorably," as may be used herein, indicates that a comparison between two or more elements, items, signals, data, etc., provides an undesired relationship.

As the term "module" is used in the description of the drawings, a module includes a functional block that is implemented in hardware, software, and/or firmware that performs one or more functions such as the processing of an input signal to produce an output signal. As used herein, a module may contain submodules that themselves are modules.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretations so as to encompass all such modifications and equivalent structures as is permitted under the law.

What is claimed is:

1. A method for vehicle charge resource management comprising:
   polling a plurality of docking stations for docking indication data, wherein each of the plurality of docking stations are operable to receive a rechargeable battery device;
   identifying a docked set as one or more of the plurality of docking stations that are coupled with a respective rechargeable battery device;
   assessing state-of-charge data for a vehicle power supply;
   assessing a recharging rate for the docked set;
   generating recharge status data based on the recharging rate, the recharge status data indicating a time-to-recharge the docked set;

in response to determining, based on a comparison of the recharge status data with the state-of-charge data for the vehicle power supply, that a residual charge component of the vehicle power supply is insufficient to recharge the docked set:

transmitting a user input request that includes the recharge status data to prompt user input;

receiving, responsive to the user input request, user input data selecting at least one rechargeable battery device coupled to a docking station of the docked set;

and transmitting a recharge command to initiate a recharge of the at least one rechargeable battery device via the vehicle power supply.

2. The method of claim 1, wherein assessing the recharging rate for the docked set comprises:

transmitting a state-of-charge data request to the docked set;

receiving, in response, a state-of-charge data response from the docked set; and generating the recharging rate for the docked set based on the state-of-charge data response.

3. The method of claim 1, wherein assessing the recharging rate for the docked set comprises:

monitoring a plurality of rechargeable-battery parameters of the docked set; and empirically determining a cell capacity and a charge of the docked set based on the plurality of rechargeable-battery parameters.

4. The method of claim 3, wherein monitoring the plurality of rechargeable-battery parameters further comprises:

monitoring current flowing into the docked set; and monitoring current flowing out of the docked set.

5. The method of claim 1, wherein the user input data further includes a recharge priority listing of the docked set.

6. The method of claim 1, wherein assessing the state-of-charge data for the vehicle power supply comprises obtaining at least one of:

Coulomb counter integrated-circuit data;

fuel gauge integrated-circuit data; and programmable fuel gauge integrated-circuit data.

7. The method of claim 1, wherein the plurality of docking stations are detachably coupled with the vehicle power supply.

8. A method for vehicle charge resource management comprising:

identifying a docked set as one or more docking stations that are coupled with a respective rechargeable battery device, wherein the docking stations are operable to receive a rechargeable battery device;

generating recharge status data based, at least in part, on a recharging rate for respective ones of the docked set, the recharge status data indicating a time-to-recharge the docked set;

in response to an electronic signal specifying a selection of at least one rechargeable battery device of the docked set, transmitting a recharge command to initiate a recharge of the at least one rechargeable battery device via a vehicle power supply, wherein the recharging rate for the docked set is determined by:

monitoring a plurality of rechargeable-battery parameters of the docked set, including monitoring current flowing into the docked set and monitoring current flowing out of the docked set, and empirically determining a cell capacity and a charge of the docked set based on the plurality of rechargeable-battery parameters.

9. The method of claim 8, wherein the recharging rate for the docked set is determined by:

transmitting a state-of-charge data request to the docked set;

receiving, in response, a state-of-charge data response from the docked set; and generating the recharging rate for the docked set based on the state-of-charge data response.

10. The method of claim 8, wherein the electronic signal further specifies a recharge priority listing of the docked set.

11. The method of claim 8, further comprising recharging the at least one rechargeable battery device while not recharging all of the respective rechargeable battery devices coupled in the docked set.

12. The method of claim 8, wherein the plurality of docking stations are detachably coupled with the vehicle power supply.

13. A vehicle control unit comprises:

a processor communicably coupled to the communication interface and to a plurality of docking stations; and a memory communicably coupled to the processor and storing:

a dock assessment module including instructions that, when executed by the processor, cause the processor to: poll the plurality of docking stations for docking indication data, wherein each of the plurality of docking stations are operable to receive a rechargeable battery device; identify a docked set as one or more of the plurality of docking stations that have a respective rechargeable battery device coupled thereto; and a battery-charge assessment module including instructions that, when executed by the processor, cause the processor to:

assess state-of-charge data for a vehicle power supply;

assess a recharging rate for the docked set; and generate recharge status data, based on the recharging rate, that operates to indicate a time-to-recharge for the docked set; and a transmission module including instructions that, when executed by the processor, cause the processor to:

in response to determining, based on a comparison of the recharge status data with the state-of-charge data for the vehicle power supply, that a residual charge component of the vehicle power supply is insufficient to recharge the docked set:

transmit a user input request that includes the recharge status data to prompt user input;

receive, responsive to the user input request, user input data selecting at least one rechargeable battery device coupled to a docking station of the docked set;

and transmit a recharge command to initiate a recharge of the at least one rechargeable battery device via a residual charge component of the vehicle power supply.

14. The vehicle control unit of claim 13, wherein the transmission module further includes instructions for accessing the recharging rate for the docked set by:

transmitting a state-of-charge data request to the docked set;

receiving, in response, a state-of-charge data response from at least one of the docked set; and generating the recharging rate for the docked set based on the state-of-charge data response.

15. The vehicle control unit of claim 13, wherein the transmission module further includes instructions for accessing the recharging rate of the docked set by:
   monitoring a plurality of rechargeable-battery parameters of the docked set; and
   empirically determining a battery cell capacity and a battery charge of the docked set based on the plurality of rechargeable-battery parameters.

16. The vehicle control unit of claim 15, wherein monitoring the plurality of rechargeable-battery parameters comprises:
   monitoring current flowing into the docked set; and
   monitoring current flowing out of the docked set.

17. The vehicle control unit of claim 13, wherein assessing the state-of-charge data for the docked set comprises obtaining at least one of:
   Coulomb counter integrated-circuit data;
   fuel gauge integrated-circuit data; and
   programmable fuel gauge integrated-circuit data.

18. The vehicle control unit of claim 13, wherein the plurality of docking stations are detachably coupled with the vehicle power supply.

* * * * *